United States Patent [19]

Habicht

[11] Patent Number: 4,949,908
[45] Date of Patent: Aug. 21, 1990

[54] ROCKER-TYPE LUMP BREAKER

[76] Inventor: Helmut Habicht, 15 Royal Park Ter., Hillsdale, N.J. 07642

[21] Appl. No.: 425,558

[22] Filed: Oct. 23, 1989

[51] Int. Cl.⁵ .............................................. B02C 1/02
[52] U.S. Cl. ...................................... 241/84.3; 241/264
[58] Field of Search ................. 241/84.3, 95, 69, 264, 241/265, 267, 268, 269; 414/420

[56] References Cited

U.S. PATENT DOCUMENTS

| | | | |
|---|---|---|---|
| 17,294 | 5/1857 | Poore | 241/84.3 |
| 700,193 | 5/1902 | Gundel | 241/84.3 |
| 963,224 | 7/1910 | Hess | 241/69 |
| 1,211,409 | 1/1917 | Chittenden | 241/84.3 X |
| 3,154,622 | 10/1964 | Reinfeld et al. | 241/69 X |
| 4,797,050 | 1/1989 | Habicht | 414/420 |

*Primary Examiner*—Mark Rosenbaum
*Attorney, Agent, or Firm*—Patrick J. Pinto

[57] ABSTRACT

A rocker-type lump breaker for breaking oversized or lumped granular materials into acceptable sizes. The lump breaker is mounted interior of a hopper. This lump breaker comprises a perforate deck member, a plurality of rocker arms carried on a oscillating or rocking shaft carried by said deck member, and a means exterior of said hopper for providing said rocking motion to said shaft. The rocker arms are adapted to co-act with apertures provided in said deck plate to break the lumped material into acceptable sizes. The acceptable sized material is passed through the deck member. The rocking motion of the shaft is controlled to produce a gap between the ends of each rocker arm and the deck member.

11 Claims, 2 Drawing Sheets

ROCKER-TYPE LUMP BREAKER

FIELD OF THE INVENTION

With respect to the classification of art as established in and by the United States Patent and Trademark Office, this invention is believed to be found in the general Class entitled as "SOLID MATERIAL COMMINUTION OR DISINTEGRATION" and more particularly "comminuted material discharge permitting screen".

Many industries, engaging in the manufacture of food, pharmaceuticals, chemicals and the like, use flowable granular materials in their manufacturing process. It is convenient for these industries to have these granular materials packaged and delivered in barrel or drum-like containers. Many of these containers are lined with a moisture barrier such as a flexible plastic bag, to protect the granular materials. These plastic bags are not 100 percent effective in controlling moisture in the container, therefore lumping of the granular materials occurs.

The machinery used in the processing of these granular materials are generally adapted to accept a size range of lumped material. The process machinery may have a grid or screened device for accepting or rejecting materials. The rejected materials, must then be removed for further conditioning, to reduce the lump size to within the processing specification.

Machinery and methods for comminuting materials are the subject of several U.S. patents. U.S. Pat. No. 621,274, issued to O'Keefe on Mar. 14, 1899; U.S. Pat. No. 2,645,910 as issued to Leeson on July 21, 1953; U.S. Pat. No. 3,154,622 as issued to Reinfeld et al on Oct. 27, 1964; U.S. Pat. No. 3,698,648 as issued to Rose on Oct. 17, 1972; and U.S. Pat. No. 4,784,334 as issued to Van Der Veer et al on Nov. 15, 1988. All of these prior art patents disclose apparatus for breaking and segregating lumped materials. U.S. Pat. Nos. 2,645,910; 3,154,622; and 3,698,648 disclose continuously rotating hammer members for breaking the materials. U.S. Pat. No. 621,274 discloses a series of knife-like members creating a more or less scissor action to break materials. U.S. Pat. No. 4,784,334 discloses a pair of rocking foot-like hammers co-operating with a stationary breaker plate to stamp or crush material.

It has been determined that it would be desirable and useful to provide a lump breaker which is relatively compact, while providing a sanitary apparatus to satisfy the requirements of various industries, some of which have been previously mentioned. It is also desireable that this lump breaking apparatus fit onto the open end of a drum. This lump breaking apparatus should also be adaptable for mounting onto existing drum emptying equipment.

It is therefore an object of this invention to provide and it does provide a compact lump breaker for breaking of lumped granular materials into discrete sizes.

It is another object to provide and it does provide a compact lump breaker which is adapted to fit closely with a drum or container carrying a material which is to be discharged into a processing machine.

It is still a further object of this invention to provide and it does provide a lump breaker, for breaking objectionable lumps in granular materials, which will not introduce contaminants into the granular materials flowing through the lump-breaking apparatus.

It is still another object of this invention to provide and it does provide a lump breaker which is adaptable to drum inverting equipment.

This present invention provides a rocker-type lump breaking apparatus which is operated by a reciprocating drive means. This lump-breaker is adapted to operate with equipment such as U.S. Pat. No. 4,797,050 issued to Habicht on Jan. 10, 1989. U.S. Pat. No. 4,797,050 is incorporated by reference into this disclosure.

In addition to the above summary, the following disclosure is detailed to insure adequacy and aid in the understanding of this invention. This disclosure, however is not intended to cover each new and inventive concept no matter how it may later be disguised either by variations in form, or additions by further improvements. For this reason there has been chosen specific embodiments of a Rocker-Type Lump Breaker. This Lump Breaker is adapted to fit onto a drum or barrel containing a granular material. The present invention is also adapted to be mounted into an existing hopper. This present invention is adapted to be used in and under sanitary conditions. These specific embodiments have been chosen for the purpose of illustration and description, as shown in the accompanying drawings wherein:

BRIEF DESCRIPTION OF THE DRAWING

In the following description and in the claims, various details are identified by specific names for convenience. These names are intended to be generic in their application. The corresponding reference characters refer to like members throughout the several figures of the drawings.

The drawings accompanying, and forming a part of this specification disclose certain details of construction for a Rocker-Type Lump Breaker. These details are for the purpose of explanation, but the structural details may be modified without departure from the concept and the principles of the invention. It is anticipated that this invention may be incorporated in structural forms other than as shown.

DETAILED DESCRIPTION OF THE PREFERRED EMBODIMENT

Figure 1:
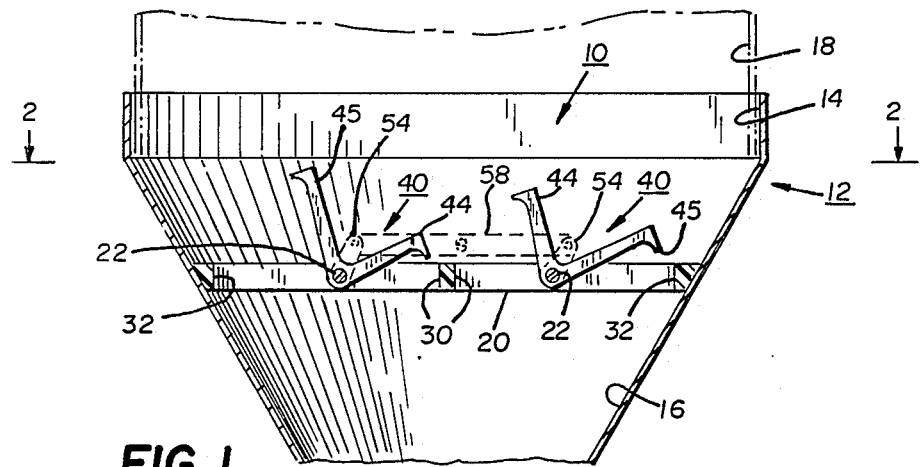
FIG. 1 represents a side-elevation, partly in section, showing the rocker-type lump breaker mounted interior of a material accepting and feeding hopper.
Figure 2:
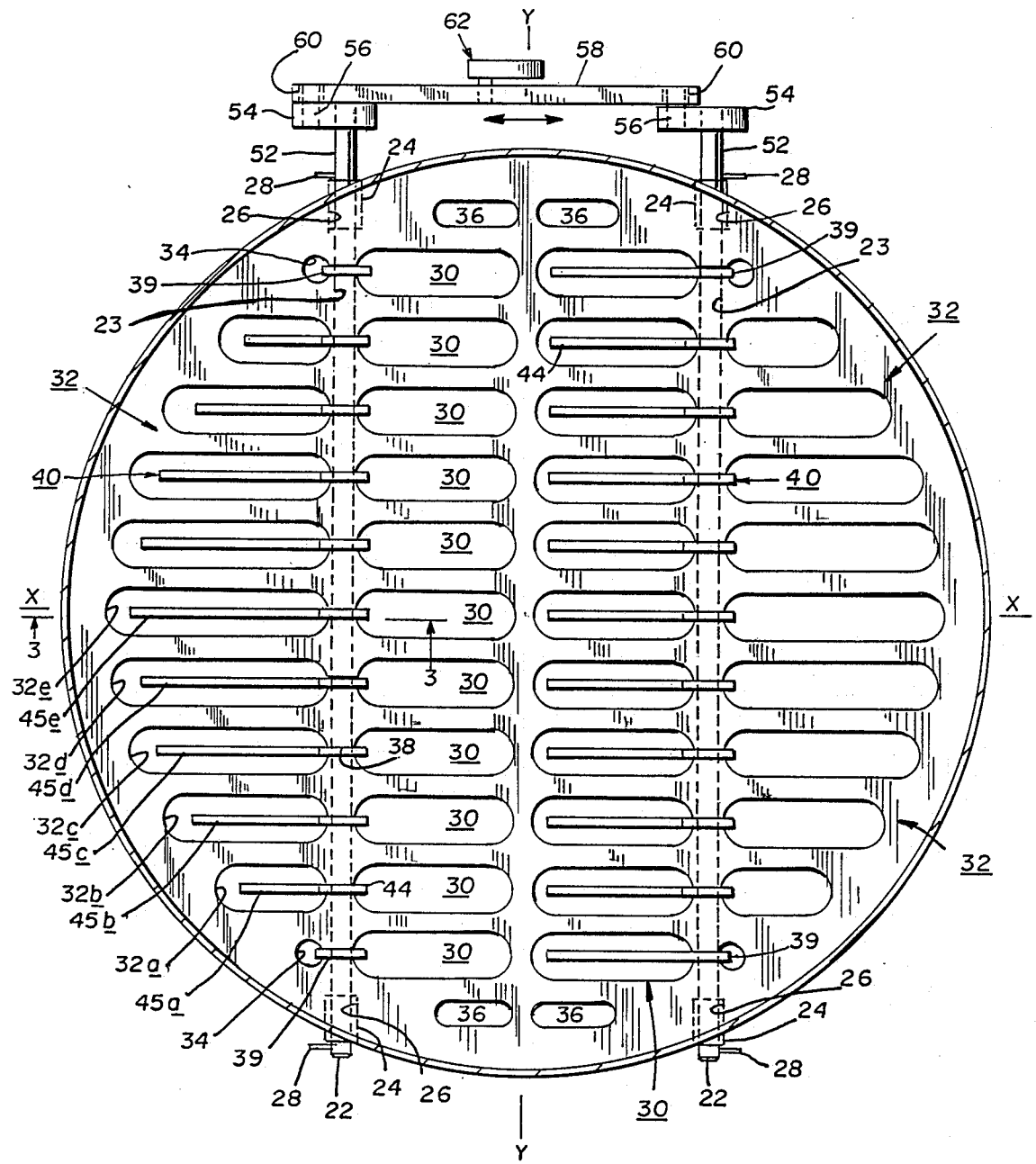
FIG. 2 represents a top plan view of the lump breaker, in enlarged scale, this view taken along line 2—2 of FIG. 1.

Referring to FIG. 1 and FIG. 2, a rocker-type lump breaker, generally identified as 10, is shown as being carried interior of a hopper 12. This hopper 12 is of conventional design having a mouth portion 14, sloping sides 16 which act as a transition to a lower dispensing mouth, not shown. This hopper 12 may have various shapes for the mouth portion 14, such as circular, rectangular, etc. The rocker-type lump breaker 10 is shown as being mounted or carried on the sloping sides 16 of the hopper 12, but the mounting position may have been chosen to be in the mouth portion 14. The mounting position is a matter of design selection. A drum or barrel 18, shown in dashed outline, is positioned in the mouth 14 of the hopper 12 to discharge material into the hopper.

A perforate deck member 20 is adapted to fit interior of the hopper 12, as previously noted the placement of the deck member 20 is a matter of design choice. This deck member 20 has a series of apertures formed therethrough. Referring to FIG. 2 the deck member 20 has been shown as having a circular outline. This configuration has been particularly chosen to show and describe the arrangement of the various components when some of the apertures have varying shapes, contours, or length. The deck member 20, is shown as being more or less symmetrical about both its X-axis and Y-axis, therefore the various components used in one of the quadrants formed by these axis are duplicated, in a more or less mirror image, in the remaining quadrants. Elongated shaft members 22 are selectively positioned in and through apertures 23 provided in the deck member 20. Each of these shaft members 22 are of sufficient length to extend exterior of the hopper 12. The hopper 12 is adapted to allow passage of the shafts 22 therethrough. Sleeve type bearings 24 are mounted in counterbored apertures 26 of the deck member 20. These sleeve bearings 24 provide alignment of the deck member 20 with the suitable holes, not shown, provided in the hopper 12. These sleeve bearings 24 may be of a suitable material which can support the granular material while isolating the shaft 22 from contact with the hopper 12. These sleeve bearings 24 also provide a supporting means for the deck member as and when the hopper is inverted. This inverted condition occurs with mobile type drum emptying equipment, such as U.S. Pat. No. 4,797,050. A plurality of a shaft retention means 28, such as a spring pin, is provided to locate the shaft 22 relative to the hopper 12. Each spring pin has been left in an extended condition providing a visual indication means. This indication means allows for the determination of the position of the rocker-arm assemblies interior of the hopper 12. It is anticipated that other retention means such as cotter pins, retaining rings, or clamp collars may be used should an indication means not be required or desired.

A plurality of apertures are provided in and through the deck member 20. The apertures 30 located between the shaft 22 and the Y-axis are substantially of equal length. The apertures, generally identified as 32, located between the shaft 22 and the wall of the hopper 12 are of varying length. The length of these apertures 32 is determined by making the radiused ends tangent to an imaginary radius. This imaginary radius has the same center as the hopper 12 and the deck 20. The apertures 32 will be designated 32a, corresponding to the smallest, and 32e, corresponding to the longest. The first and last of elongated apertures 30 do not have an associated aperture 32, but a more or less round aperture 34 to provide clearance and sized to allow fine granular materials to pass through and into the lower portion of the hopper 12. A plurality of elongated apertures 36 are provided at or near each extent of the Y-axis. These elongated apertures 36 are selectively sized to allow acceptable lumps and fine materials to pass through the deck 20. These apertures 36 are provided to eliminate shelf areas upon which material can collect.

Figure 4:
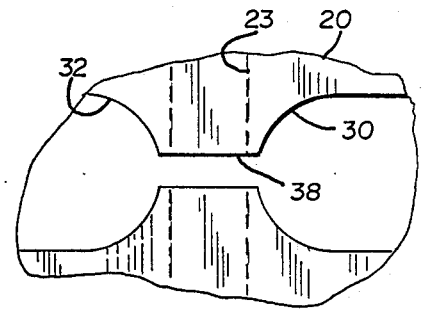
FIG. 4 represents a fragmentary top plan view of a perforate deck member, this view showing an enlarged view of a passageway connecting adjacent elongated apertures.

Referring to FIG. 4, there is shown a connecting through passageway 38. This passageway 38 connects elongated aperture 30 with elongated aperture 32. This connecting passageway 38 is provided to allow the insertion of a rocker-arm member 40, in a more or less slip-fit condition, into the deck 20.

Figure 3:
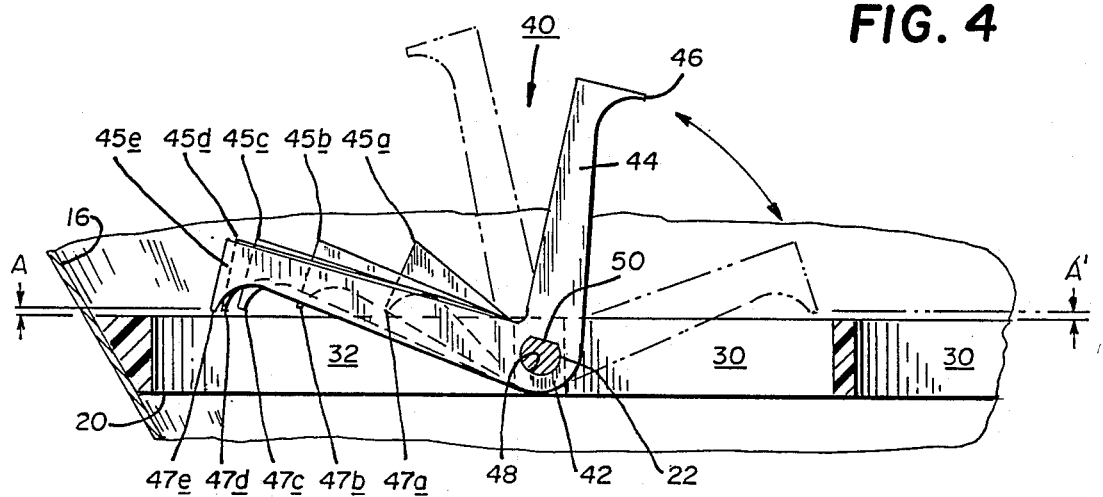
FIG. 3 represents a fragmentary side-elevation of the rocker-type arms, in an enlarged scale. This view taken along line 3—3 of FIG. 2.

Referring to FIG. 3, the rocker-arm member 40 may be seen as having a hub portion 42 and a first shaped arm portion 44 and a second shaped arm portion 45. An end 46 is provided on the first shaped portion 44 distal the hub 42. Similarly an end 47 is provided on second arm portion 45 distal the hub 42. These end portions 46 and 47 are adapted to break lumped granular materials. This breaking action occurs upon impact of each of the ends 46 or 47 with the lumped material.

The hub 42 is provided with a through aperture 48. This aperture 48 is adapted to engage the shaft 22, by a drive means. In this embodiment, the drive means includes a flat 50 provided on the shaft 22 and the mating aperture 48 is formed in a more or less "D" configuration. It is contemplated that other suitable driving arrangements may be provided such as an aperture 48 having a integral key to mate with an elongated keyseat in the shaft 22, a splined connection and the like.

Referring to FIG. 1 and FIG. 2, one end 52 of each shaft 22 is of sufficient length to carry and engage a lever 54. This lever 54 is removably engaged on each shaft 22 by a suitable means. A pin member 56 is pressed into one end of the lever 54 distal said shaft engagement portion. This pin 56 is adapted to be pivotly carried in a link member 58. The link may be provided with a bearing 60 to carry the pin 56. A suitable reciprocating drive means 62 is provided to urge the link 58 attached to the each lever member 54 in the direction of the arrows.

USE AND OPERATION

The present invention is adapted to be fitted to a stationary hopper or a mobile hopper as shown in U.S. Pat. No. 4,797,050. The mobile type hopper devices are designed to carry a drum or barrel in a more or less upright condition, then lift and invert the drum emptying its contents for further processing.

Referring to FIG. 1, the rocker-type lump breaker 10 is shown as mounted interior of the hopper 12. The deck member 20 is contoured to closely follow the contour of the hopper 12. It is anticipated that a more or less scalloped peripheral surface may be provided as needed to minimize the amount of material collecting on shelf areas. This deck member 20 is preferrably made of a suitable plastic plate material, which is machined as required to suit the contour of the hopper 12. Referring to FIG. 2 and FIG. 3, since a circular deck member 20 is shown, it is necessary to provide a plurality of rocker-arm members 39, 40a, 40b, 40c, 40d, and 40e carried by and in said deck member 20. These rocker-arm members 40a through 40e have at least one shaped arm portion 45 which is graduated in length. It is to be noted that when a hopper 12 has a rectangular shape all of the apertures 30 and 32 in and through the deck member 20 are uniform, therefore all of the rocker arms 40 will be substantially the same.

As shown, each of the rocker-arms 40 is contoured to have a first shaped arm portion 44. This first shaped arm portion 44 is adapted to co-operate with an elongated aperture 30. This aperture 30 is selectively sized to provide clearance between the first end 46 and its end. The second shaped arm portion 45 is selectively sized to provide a uniform clearance between each end 47a, 47b, 47c, 47d, and 47e and the end of its associated aperture 32a through 32e. The first rocker-arm 39 and last rocker-arm 39 have a single shaped end portion 44. These rocker-arm members 39 and 40 are preferably made of a Stainless Steel material which has been shaped by conventional machining techniques or laser cutting.

The rocker arm members 40 are adjusted and positioned to provide a small gap "A" between the end 47 and the deck member 20 at one extent of its motion. A similar gap "A'" is provided, between the end 46 and the deck 20, at the other extent of the rocker-arm movement. The rocker-arms 39 and 40 are adjusted so as to avoid contamination of the granular material being passed through the hopper with foreign materials. As previously mentioned many drums, barrels, or cartons have a liner such as a plastic bag to protect the contents within. It is common for the plastic bag to become dislodged as and when the drum, barrel or container is emptied. This condition becomes more of a problem when the drum or the like 18 is inverted, as shown in FIG. 2.

The gap "A" and "A'" are provided to avoid shearing of the plastic bag liner. This shearing would allow small pieces of the bag to contaminate the granular material. The preferred adjustment will provide a minimum gap at "A" and "A'" of 1.5 mm. It is quite possible that the bag may be punctured by the end 46 or 47 of the rocker-arm 39 or 40, but no pieces will be torn or sheared from the bag, to eventually fall through the opening in the deck member 20. When a circular hopper 12 is provided, it is necessary to provide rocker-arms having shaped arm portion 45 which are individually contoured to maintain the desired gap "A" and "A'", during the rocking motion of the rocker-arms 40.

Each of the rocker-arms 40 are held and maintained in position by the side walls of the passageway 38. The clearance between the rocker-arm 39 or 40 and the side walls of the passageway 38 is preferrably between 0.1 mm. to 0.2 mm. Each of the rocker-arms 39 and 40 is correctly positioned on the shaft with all of the first shaped arm portions 44 substantially in superimposed alignment. This superimposed alignment is provided and maintained by the flat 50 on shaft 22.

As an example, if the allowable size of the material is 2.54 cm. (1 in.), then the apertures 30 and 32 are 2.54 cm. wide. The co-operating arcuate action of the rocker-arms 39 and 40 with the apertures 30 and 32 breaks the lumped granular materials into acceptable sizes. The arcuate action, in the arrangement shown, is more or less 62 degrees. Of course it should be understood that other sizing requirements would require different sizes and quantities of apertures 30, 32, 34, and 36, along with other arcuate rotation of the rocker arms.

The drive means 62 engages the link 58 to provide a more or less parallel rocker movement between each group of rocker-arm assemblies. The preferred drive means 62 is a fully enclosed pneumatically operated servo-actuator. It is also anticipated that other drive means may be employed such as an air cylinder, a rotary crank, and the like. Each of the drive means may drive the rocker assemblies simultaneously or individually.

It may be noted that should the hopper be of a small size, it is contemplated that only one rocker assembly will be needed. It is further anticipated that a rectangular hopper will require a plurality of the same rocker arm, whereas a circular hopper will require rocker arms having graduated shaped arm portions at each extent.

It should be noted that the rocking action of the rocker assemblies will agitate the granular material in the drum. This agitation will help to eliminate bridging of the materials in the hopper. It is also anticipated that a vibratory device may be mounted on the hopper should the materials have an affinity for bridging.

The preferred arrangement provides a hopper 12 with a Rocker-type lump breaker 10 mounted therein and thereon. The drum 18 would be clamped between the hopper 12 and a lifting platform, not shown. The platform would lift and invert the barrel simultaneously, as shown and described in U.S. Pat. No. 4,797,050. After the drum is emptied of its contents, the platform is returned to its start position.

An alternate arrangement would require the installation of the rocker-type lump breaker 10 into an existing hopper 12.

In its construction and use, the Rocker-type lump breaker depicted and described above is believed to provide the basis for a method of construction and use. This method including the steps of:

providing mounting holes in a hopper;

placing a perforate deck member interior of said hopper, said deck member contoured to closely mate with said hopper, said deck member having rows of elongated apertures, said deck member having a connecting passageway between adjacent apertures in each pair of rows, said deck member having a through aperture extending from one edge of the deckmember to an opposite edge of the deck member, said through aperture passing though each connecting passageway;

inserting a sleeve bearing into each end of said through aperture, said sleeve member positioned to extend in and through said mounting holes of the hopper;

inserting an elongated shaft into said sleeve member;

providing a plurality of shaped rocker arm members, said rocker arm members having a hub end, a first shaped end and a second shaped end, said hub end having an aperture adapted to engage said elongated shaft, said first shaped arm portion having a first end, said second shaped arm portion having a second end;

inserting one of said rocker arms into each connecting passageway and progessively inserting said elongated shaft into the aperture of each inserted rocker arm;

providing a retaining means at each end of the elongated shaft after complete insertion of the shaft to a determined position;

providing a drive means, said drive means providing a reciprocating movement to the elongated shaft; and adjusting said drive means to provide a determined extent of movement, said extent of movement providing a desired clearance between the deck member and either the first end or second end of the rocker arm.

Terms such as "left", "right", "up", "Down", "bottom", "top", "front", "Back", "in", "out" and the like are applicable to the embodiments shown and described in conjunction with the drawings. These terms are merely for the purpose of description and do not necessarily apply to the position in which the Rocker-Type Lump Breaker of the present invention may be used or constructed.

While these particular embodiments of a Rocker-Type Lump Breaker has been shown and described, it is to be understood that the invention is not limited thereto and protection is sought to the broadest extent the prior art allows.

What is claimed is:

1. A rocker-type lump breaking apparatus for breaking oversized or lumped granular materials into acceptable sizes, said granular material carried in a hopper, said lump breaking apparatus including:

(a) at least one first aperture provided in and through a wall of a hopper;

(b) a substantially flat deck member contoured to closely fit at a selected position interior of the hopper;

(c) a plurality of elongated apertures, selectively positioned in and through each major surface of said deck member, said plurality of apertures arrayed in at least one row, each major axis of said elongated apertures arrayed in substantially parallel spaced alignment;

(d) at least one elongated shaft member, said shaft member rotatively carried in and through said deck member, said shaft member passing through each elongated aperture at a selected point, an axis of said shaft arrayed transverse to the major axis of each elongated aperture;

(e) a drive end of said shaft member, said drive end extending exterior of said hopper, said shaft member passing through said first aperture in the wall of the hopper;

(f) a plurality of rocker arm members, said rocker arm members having a first shaped arm portion, a second shaped arm portion, and a hub portion, said first shaped arm portion and second shaped arm portion radially extending from said hub portion at selected positions, said hub portion having a drive means for engaging said shaft member, one of said rocker arms carried interior of each of said elongated apertures in the deck member;

(g) said first shaped arm portion and second shaped arm portion having means for breaking lumped or oversize granular materials; and (h) a reciprocating drive means adapted to attach to said drive end of the shaft, said reciprocating drive means causing said first shaped arm portion and said second shaped arm portion to alternately co-act with said deck member for breaking said oversized or lumped materials into acceptable sizes, said acceptable sized material passing through said elongated apertures in the deck member into a lower portion of said hopper.

2. A lump breaking apparatus as recited in claim 1 wherein said plurality of elongated apertures includes:

(a) a first elongated portion on one side of the shaft member, said first elongated portion having a determined length and width;

(b) a second elongated portion on the other side of said shaft member opposite said first elongated portion, said second elongated portion having a determined length and width; and (c) a selectively sized passageway connecting said first elongated aperture with said second elongated aperture, said passageway being narrower in width than said first elongated portion and second elongated portion, said passageway providing positioning alignment for each of said rocker arm with its associated elongated aperture.

3. A lump breaking apparatus as recited in claim 2 wherein said shaft member has a second end distal said drive end, said second end passing though a second aperture in said hopper, said second aperture in and through a wall of said hopper opposite said first aperture, said shaft member having a plurality of a retention means, said retention means carried on said shaft member exterior of said hopper for maintaining alignment of said shaft member relative to the hopper.

4. A lump breaking apparatus as recited in claim 3 wherein said deck member is of a plastic material, said deck member is adapted to carry a plurality of sleeve members, each of said sleeve members adapted to carry each end of the shaft adjacent the hopper, said sleeve member further adapted to isolate the shaft from abraiding the hopper, and said sleeve member also providing a support means for said deck member as and when the hopper is placed in an inverted postion.

5. A lump breaker apparatus as in claim 4 wherein each of said rocker arms is formed of a stainless steel material.

6. A lump breaker apparatus as in claim 5 wherein said rocker arm further includes:

(a) a first end of said first shaped arm portion, said first end distal said hub;

(b) a second end of said second shaped arm portion, said second end distal said hub; and (c) an adjustable reciprocating drive means for alternately stopping said first end and second end at a determined distance above said deck member.

7. A lump breaker apparatus as recited in claim 6 wherein said reciprocating drive means further includes:

(a) a lever member mounted on the drive end of each shaft member;

(b) an actuator; and (c) a connecting link member for connecting said lever with said actuator.

8. A lump breaker apparatus as recited in claim 7 which further includes:

(a) a plurality of said actuator;

(b) a plurality of connecting link members for connecting each actuator to each lever member, each of said actuator providing independent and individual reciprocating motion to its associated shaft member.

9. A lump breaker apparatus as recited in claim 6 which further includes:

(a) said deck member having a rectangular contour for mating with the interior of a rectangular hopper;

(b) each of said first elongated portions of said elongated apertures being substantially equal;

(c) each of said second elongated portions of said elongated apertures being substantially equal; and (d) each of said rocker arms are substantially identical.

10. A breaker apparatus as recited in claim 6 which further includes:

(a) said deck member having a circular contour, said circular contour adapted to mate with a circular hopper;

(b) said first and second elongated portions of said elongated apertures in and through said deck member have varying lengths to follow the circular contour of the deck member; and (c) the first and second shaped arm portions of the rocker arms are of varying length to correspond with its associated elongated first or second elongated portions.

11. A lump breaker apparatus as recited in claim 6 which includes:

(a) said deck member having a circular contour;

(b) at least two rows of said elongated apertures in and through said major surface of the deck member;

(c) at least two shaft members, one of said shaft members selectively positioned in and through each of said rows of elongated apertures;

(d) said first elongated portion of said elongated aperture located between each pair of shaft members being of equal length;

(e) said second elongated portion of each elongated aperture located between said shaft member and a wall of the hopper, each of said second elongated portion having a varying length to follow the contour of the deck member;

(f) each of said first arm portions of said rocker arms being of equal length to correspond with its associated first elongated portion; and (g) each of the second shaped arm portions being of varying length to correspond to the length of its associated second elongated portion of the elongated aperture.

* * * * *